Jan. 2, 1951     E. P. HURD     2,536,288
FISHING REEL
Filed Nov. 9, 1946
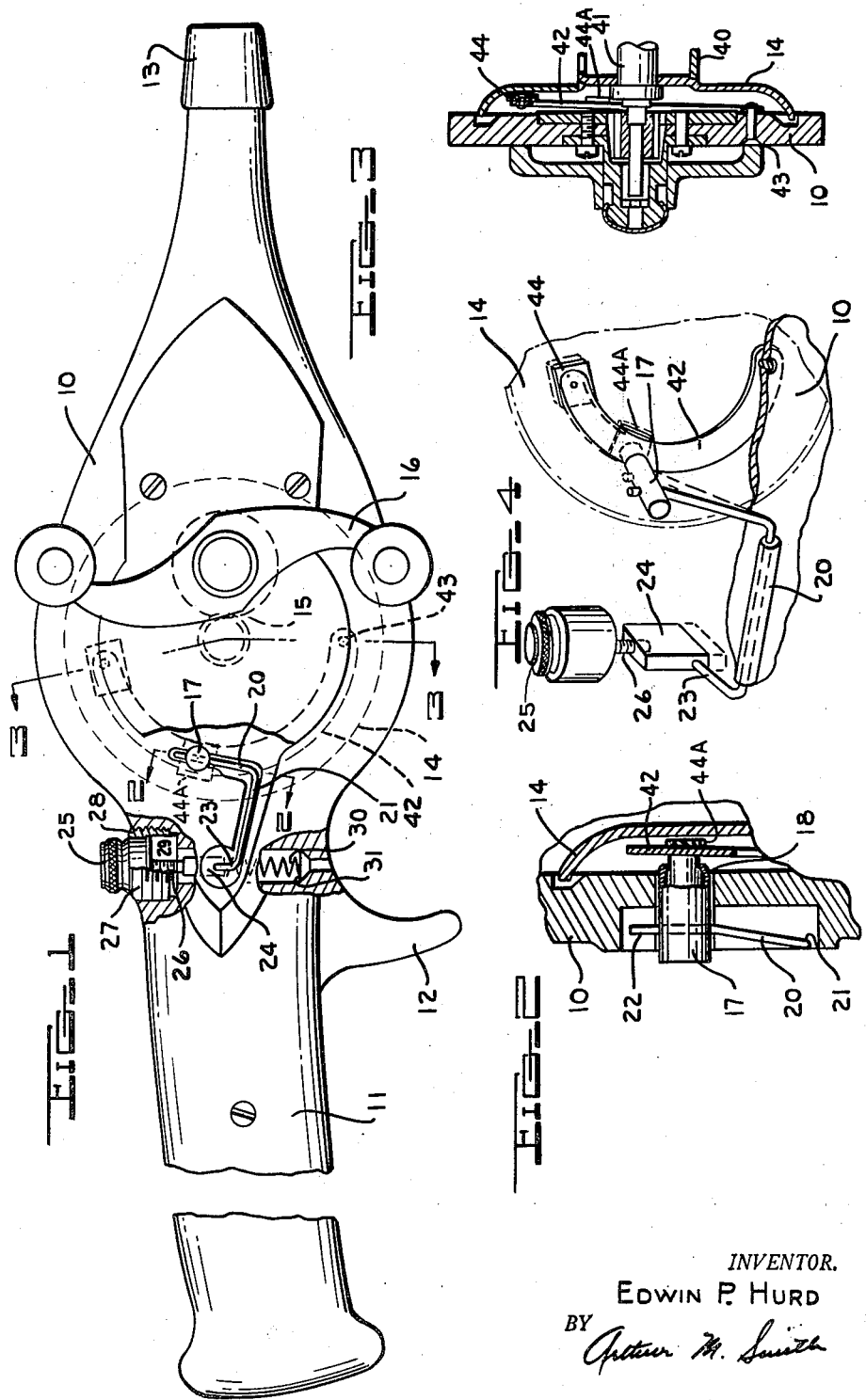
INVENTOR.
EDWIN P. HURD
BY Arthur M. Smith
ATTORNEY Patented Jan. 2, 1951

2,536,288

UNITED STATES PATENT OFFICE 2,536,288

FISHING REEL

Edwin P. Hurd, Detroit, Mich., assignor to Hurd Lock and Manufacturing Company, Detroit, Mich., a corporation of Michigan Application November 9, 1946, Serial No. 708,915

6 Claims. (Cl. 242—84.5)

The present invention relates to a fishing reel and more particularly to a fishing reel in which the speed of rotation of the line spool is readily controlled at all times by the user.

The present application is related to my co-pending application Serial No. 673,761, filed June 1, 1946.

The principal objects of the present invention are:

1. To provide a fishing reel in which a combined adjustable drag and manually actuated brake mechanism is utilized to assure control of the speed of rotation of the line spool.

2. To provide a fishing reel having an enclosed combined resiliently mounted drag and manually applied resilient brake for controlling the speed of rotation of the line spool, the reel being characterized by its relative simplicity, making for the economical mass production manufacture thereof; its rugged construction, making for dependability and long life in service; and its responsiveness to all applied pressures to assure the application of a definite and positively controlled braking force on the flanged portion of the line spool; and the positive and instantaneous release of the braking force upon the release of the brake applying pressures.

3. To provide a fishing reel in which an adjustable drag is combined with a positive, manually applied and automatically released, mechanical brake to control both the speed of rotation of the line spool and the positive stopping of such rotation when desired, the brake applying mechanism being simple in its construction and positive in its operation and release while being readily controlled by the user through a conveniently located adjustable brake applying member.

Other objects of this invention will appear in the following description and appended claims, reference being had to the accompanying drawings forming a part of this specification wherein like reference characters designate corresponding parts in the several views.

In the drawings:

Fig. 1 is a fragmentary side elevation with parts broken away showing one type of fishing reel incorporating the combined adjustable drag and brake mechanism of the present invention.

Fig. 2 is a fragmentary cross-section taken substantially on the line 2—2 of Fig. 1 looking in the direction of the arrows.

Fig. 3 is a section taken substantially on the line 3—3 of Fig. 1 looking in the direction of the arrows.

Fig. 4 is a schematic view showing the operating mechanisms and linkages of the combined adjustable drag and brake mechanism of the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

It is understood that the combined adjustable drag and brake mechanism of the present invention may be applied to any desired type of fishing reel mechanism in which a rotatable line spool 40 is mounted in a reel housing 10. In the drawings I have shown the combined adjustable drag and brake mechanism as applied to a new type of reel, the structural details of which are more fully disclosed in my co-pending application Serial No. 675,388 filed June 8, 1946. Since the present invention is concerned primarily with the combined adjustable drag and brake mechanism, I have deemed it advisable in the interest of simplicity not to show in this application the details of the reel mechanism itself but have shown only those parts of the reel mechanism which are necessary to explain fully the construction and operation of the combined adjustable drag and brake mechanism of the present invention.

Referring to Fig. 1, the fishing reel there shown and with which the present invention may be utilized comprises a body housing 10 having a pistol type handle 11 which overlies a rigid gripping trigger 12 at one end. The other end of the body housing 10 terminates in a rod ferrule seat 13. A line spool 40 is journaled for rotation on the shaft 41 supported at its ends in the housing 10. The spool 40 has dished flat ends, one of which is indicated at 14. The line spool 40 is operatively connected through a gear train 15 (shown in Fig. 1 in dotted line only) with a double crank spool winding handle 16.

When a fishing reel, such as that here shown, is used for bait, fly, or plug casting, it is desirable to control the speed of rotation of the line spool in accordance with the variable conditions of each cast. For many years fishermen have controlled the spool rotation speed by "thumbing" the spool at the point where the line is wound on the spool. While this method has the advantage of providing a ready control for the speed of the spool during each cast and allows the user to compensate directly for the variable factors involved in each cast, it has a wearing effect on the line and also affects the uniform winding of the line on the spool.

Recently, reels have been placed on the market in which a so-called "automatic thumbing" device is provided, usually in the form of an adjustable drag which may be adjusted in advance of each cast to compensate for certain of the factors such as the weight of the bait, plug, or fly. However, in the use of such adjustable drag devices, it usually is necessary for the user to rely upon thumbing of the spool in order to control the speed of the spool during the actual cast to compensate for the variable conditions of the particular cast.

The variation in the weights of artificial lures, baits, and the like, will cause rotation of the line spool at various speeds. This is a relatively fixed factor in each cast with a particular lure, bait or the like and may be compensated for by adjustments of the drag mechanism prior to the cast. Other factors which influence the spool speed during each cast are variable factors during each cast and include wind velocity and direction, the skill of the fisherman, weeds, water conditions, and the like. Each of these variable factors must be compensated for by the fisherman largely during the interval of each cast of the lure, bait, or the like. The combination of the relatively fixed factors and the variable factors frequently causes rotation of the line spool in such a manner that the inertia of the spool will cause it to continue to rotate after the bait, lure, or fly ceases to carry out the line on the cast. In this instance, the over-running of the spool causes tangles in the line or looseness of the line on the core of the spool so that subsequent casts are impaired by loose lines, back lashes, and the like. In the instances where a fixed drag is provided to retard the free running of the spool, the length of the cast may be cut down. While such so-called "mechanical thumbing" drag devices simulate the operator's thumb in operation so far as concerns the application of a retarding force on the line spool, such devices act only to provide a fixed amount of friction causing a predetermined amount of retardation on the rotation of the spool. They do not, as previously pointed out, provide a brake mechanism which may be mechanically applied at the option of the operator in order to increase the amount of drag or to bring the spool to a complete stop during the cast in order to compensate for the variable factors which may be involved in each cast. The adjustment of the "mechanical thumbing" devices provides a fixed amount of drag on each cast and there is no control or variation of this amount of drag during the cast so as to assure the optimum operation of the reel. It is important that length of the cast be not unduly impaired by the amount of the fixed drag applied, yet the free running spool must be readily controlled in order to prevent its over-running of the line.

According to the present invention I have provided a combined adjustable drag and manually applied mechanical brake which, as shown in the drawings, comprises a brake applying member 17 in the form of a cylindrical plunger member mounted for reciprocation in an orifice 18 in the housing 10. The brake applying member 17 is moved into surface contact with an arcuate spring 42 which is secured at one end by the rivet 43 to the housing 10. The other end of the spring 42 is free and carries a pad 44 of a brake friction material, such, for example, as chrome, tanned leather, or the like, which may be moved into contact with the braking surface of the dished spool end 14 when a braking force is applied to the member 17. A pad 44A of a similar brake friction material is secured to the spring 42 at a point between the ends thereof. The pad 44A is normally held out of frictional contact with the end 14 of the spool until after an initial braking force has been applied thereto by the pad 44. The continued braking pressures applied by the member 17 to the spring 42 after contact of the pad 44 with the end 14 of the spool causes sufficient movement of the spring 42 to bring the pad 44A into braking contact with the end 14 of the spool. As here shown, the frictional surfaces 44 and 44A are brought into engagement with the enclosed braking surface of the dished spool end 14 at spaced points near its periphery so that the braking force is applied and effectively distributed over a large area on the spool end, thus reducing localized wear and permitting the maximum braking effect from the braking effort exerted through the brake applying mechanism. If desired, the pads 44 and 44A may be so arranged that the pad 44 is used alone to provide the drag on the spool while both pads are used to brake the spool.

Movement of the brake applying member 17 into brake applying position is under the control of the operator through a brake linkage which comprises a resilient brake arm 20 which extends through a brake arm channel 21 in the housing 10. The brake arm channel 21 acts as a bearing in which the resilient brake arm 20 is journaled. One end 22 of the arm 20 is connected with the brake applying member 17, as, for example, by extending through a hole drilled in the end of the said brake applying member 17. The other end 23 of the arm 20 is attached to a brake connector plate 24 which is connected with an adjustable brake applying button 25 by means of a screw threaded shank 26 which is secured to the button 25 and has a screw threaded engagement with the brake connector plate 24.

The adjustable brake applying button 25 is mounted in a bushing 27, which in the present instance is screw threaded into the body of the housing 10, but which in other instances may be a pressed fit member. The bushing 27 is provided with an inturned end flange 28 which is adapted to contact an enlarged collar 29 on the base portion of the button 25. A coil spring 30 is seated in a spring pocket 31 which is provided in the housing 10 and exerts a resilient pressure directed upwardly on the bottom of the connector plate 24 to hold the button 25 in its raised position so that the collar 29 contacts the inturned end flange 28 of the bushing 27 at all times. This permits the button 25 to be depressed by pressures exerted thereon by the user.

By rotation of the button 25 the connector plate 24 is raised or lowered in relation to the bottom of the button 25 and thus moves the brake arm 20, either to move the brake applying member 17 out of or into braking contact with the spring 42. If it is desired to provide a drag on the spool, this is accomplished by adjustment of these mechanisms by turning the button 25 so as to move the brake applying member 17 into the desired amount of engagement with the spring 42 to bring the pads 44 and 44A of friction braking material into contact with the end 14 of the spool 40. Thus, the extent of frictional contact between the pad 44 or the pad 44A of braking material and the end 14 of the spool is controlled by the adjustment of the button 25. After the amount of drag is thus adjusted to provide the minimum drag desired, added drag or braking pressures may be applied on the spool 40 during the cast by the exertion of pressures on the button 25 to effect its depression. The pressures on the button 25 are yieldably resisted by the spring 30 and by the spring 42 so that a cushioned or resilient braking effect is achieved at all times.

If it is desired to stop rotation of the spool completely, this is achieved at any time by exerting additional pressures on the button 25 so as to cause the connector plate 24 to move downwardly in the direction of the arrows as shown in Fig. 4 and this movement causes the brake arm 20 to move the brake applying member 17 from its full line position to the dotted line position there shown, and thus to apply a braking force on the spring 42 to move the pads 44 and 44A into braking engagement with the end 14 of the spool 40.

The arcuate spring 42 is so formed and so secured to the housing 10 that it normally exerts a resilient pressure on the brake applying member 17 tending to hold it in a brake releasing position and to maintain the pads 44 and 44A of brake friction material out of engagement with the braking surface of the dished end 14 of the spool 40. The resilient pressures of the spring 42 thus assure a cushioned drag and braking effect and assure a positive and instantaneous release of the braking effect on the spool upon the release of the brake applying pressures.

Thus it will be seen that the present invention provides a readily adjustable drag on the spool member of the reel and at the same time permits control of the spool rotation during each casting operation so that the actual speed of rotation of the spool is at all times under the positive control of the operator. It will also be seen that the combined adjustable drag and brake mechanism here disclosed is completely enclosed within the reel housing and within the flanged end of the spool. Hence water, dirt, grit, oil, and the like cannot affect the desired operation of either the drag or the brake mechanism. It will be apparent that the combined adjustable drag and brake mechanism of the present invention may be applied to any desired type of fishing reel merely by providing the necessary openings in the reel housing to accommodate the parts of the mechanism here disclosed.

Reference is hereby made to my said co-pending applications for any details of construction or operation of the reel mechanisms which are here omitted in the interest of clarity and to simplify the present disclosure.

I claim:

1. A combined drag and brake for a fishing reel spool and comprising a resilient member having one fixed end and one movable end, a plurality of spaced apart separate pads of friction material secured to said resilient member, and control means to move the movable end of said resilient member toward the fishing reel spool and one of said plurality of separate pads of friction material into contact with the fishing reel spool to provide a drag thereon and selectively thereafter to move the movable end of said resilient member further toward said spool to effect contact between said spool and other of said separate pads of friction material to provide a brake for the fishing reel spool.

2. A combined drag and brake for a fishing reel spool as claimed in claim 1 and further characterized in that said control means comprises a brake applying member mounted in the reel housing and a link system connecting said brake applying member and said resilient member.

3. A combined drag and brake for fishing reel spool and including a spring brake arm having one movable end and one end fixed to the housing of the fishing reel, separate pads of a brake lining spaced apart from each other to provide interrupted braking surfaces and secured at spaced points to the movable portions of said brake arm, and a combined brake applying member mounted in the reel housing and engaging said brake arm intermediate at least one of said separate pads of brake lining and the fixed end thereof, said applying member being adapted to move the movable end of said brake arm selectively into drag or brake applying position on the fishing reel spool, said one of said separate pads of said brake lining being arranged to contact the fishing reel spool in advance of the other pads thereof.

4. A combined drag and brake for a fishing reel spool and including a spring brake arm having one movable end and one end fixed to the housing of the fishing reel, a brake lining consisting of two spaced apart pads of friction material secured to the movable portion of said arm, one of said pads being positioned at the free end of said brake arm and the other being mounted at an intermediate point between the free end and the fixed end thereof, and a combined brake applying member mounted in the reel housing and engaging said brake arm intermediate the ends thereof, said applying member being adapted to move the movable end of said brake arm whereby the first named pad makes the initial braking contact with the fishing reel spool in advance of contact between the second named pad and the spool.

5. A combined drag and brake for a fishing reel spool and including a flat spring crescent shaped brake arm having one movable end and one end fixed to the housing of the fishing reel, brake lining secured at spaced points to the movable portions of said arm, and a combined drag and brake applying member mounted in the reel housing and adapted to move the movable end of said brake selectively into drag or brake applying position on the fishing reel spool, said drag and brake applying member comprising a reciprocal plug having a contact with said brake arm between said fixed end and said free end thereof on the side opposite the brake lining thereon and means to effect reciprocation of said plug and including a vertically reciprocable push button and a connecting linkage between said push button and said plug, one of said portions of the brake lining being arranged to contact the fishing reel spool in advance of the other portions thereof.

6. A combined drag and brake for a fishing reel spool and including a flat spring crescent shaped brake arm having one movable end and one end fixed to the housing of the fishing reel, brake lining secured at spaced points to the movable portions of said arm, and a combined drag and brake applying member mounted in the reel housing and adapted to move the movable end of said brake arm selectively into drag or brake applying position on the fishing reel spool, said drag and brake applying member comprising a reciprocal plug having a contact with said brake arm between said fixed end and said free end thereof on the side opposite the brake lining thereon and means to effect reciprocation of said plug and including a vertically reciprocal push button and a connecting linkage between said push button and said plug, said brake lining having two segments, one of which is mounted adjacent the free end of the brake arm and the other of which is mounted at an intermediate point between the free end and the fixed end of said arm whereby the first main segment makes initial contact with the fishing reel spool in advance of contact between the second main segment and the spool.

EDWIN P. HURD.

REFERENCES CITED

The following references are of record in the file of this patent:

UNITED STATES PATENTS

| Number | Name | Date |
|---|---|---|
| 369,622 | Titus, Jr. | Sept. 6, 1887 |
| 1,095,807 | Burt | May 5, 1914 |
| 1,299,959 | Keyser | Apr. 5, 1919 |
| 1,948,333 | Case | Feb. 20, 1934 |
| 2,316,314 | Burdick | Apr. 13, 1943 |